(12) United States Patent
Zhang et al.

(10) Patent No.: US 12,520,396 B2
(45) Date of Patent: Jan. 6, 2026

(54) DRIVER CIRCUIT

(71) Applicant: SIGNIFY HOLDING B.V., Eindhoven (NL)

(72) Inventors: Hui Zhang, Shanghai (CN); Jianliang Wu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 158 days.

(21) Appl. No.: 18/682,638

(22) PCT Filed: Aug. 11, 2022

(86) PCT No.: PCT/EP2022/072528
§ 371 (c)(1),
(2) Date: Feb. 9, 2024

(87) PCT Pub. No.: WO2023/017111
PCT Pub. Date: Feb. 16, 2023

(65) Prior Publication Data
US 2025/0133638 A1    Apr. 24, 2025

(30) Foreign Application Priority Data

Aug. 12, 2021 (WO) ................ PCT/CN2021/112356
Sep. 10, 2021 (EP) ..................................... 21195920

(51) Int. Cl.
*H05B 45/30* (2020.01)
*H05B 45/325* (2020.01)
*H05B 47/175* (2020.01)
*H05B 47/18* (2020.01)

(52) U.S. Cl.
CPC ........... *H05B 45/325* (2020.01); *H05B 47/18* (2020.01); *H05B 47/196* (2024.01)

(58) Field of Classification Search
CPC ...... H05B 45/10; H05B 45/30; H05B 45/325; H05B 47/10; H05B 47/18; H05B 47/196
See application file for complete search history.

(56) References Cited

U.S. PATENT DOCUMENTS

| | | |
|---|---|---|
| 6,507,158 B1 | 1/2003 | Wang |
| 2015/0373796 A1 | 12/2015 | Bahrehmand |
| 2018/0116024 A1* | 4/2018 | Murakami ............ H05B 45/12 |
| 2020/0022237 A1 | 1/2020 | Lee et al. |
| 2021/0144818 A1 | 5/2021 | Rodriguez |

* cited by examiner

*Primary Examiner* — Jimmy T Vu

(57) ABSTRACT

Proposed is a driver circuit for a lighting device which caters for both a control method using an electronic control signal and a manual control signal. The driver circuit has a power control circuit and a selection circuit. The selection circuit is configured to control the power control circuit so that a manual control signal is either employed or disregarded. In this way, the power control circuit may be controlled to set the output power of the driver circuit according to either the manual control signal or an electronic control signal. Specifically, the electronic control signal is prioritized over the manual control signal when the electronic control signal is valid.

13 Claims, 3 Drawing Sheets

DRIVER CIRCUIT

CROSS-REFERENCE TO PRIOR APPLICATIONS

This application is the U.S. National Phase application under 35 U.S.C. §371 of International Application No. PCT/EP2022/072528, filed on Aug. 11, 2022, which claims the benefit of International Application No. PCT/CN2021/112356, filed on Aug. 12, 2021 and European Patent Application No. 21195920.0, filed on Sep. 10, 2021. These applications are hereby incorporated by reference herein.

FIELD OF THE INVENTION

This invention relates to a driver circuit which is configured to provide an output power for driving a lighting device.

BACKGROUND OF THE INVENTION

Many types of driver circuit for lightning devices are known. Typically, with such conventional driver circuits, a single method is provided for controlling (i.e. setting, defining, adjusting, etc.) the output power. Consequently, there exist many different methods of setting output power for lighting device.

By way of example, for LED driver circuits, there exist many different kinds of output current setting methods, including methods which use: wireless programming (e.g. near-field communication, NFC), a standardized LED module interface (e.g. LEDset interface), dual in-line package (DIP) switches, etc.

There is a need to develop a driver circuit which caters for different control methods. In particular, it is desired to develop a single driver circuit which caters for methods using wireless programming (e.g. NFC) and DIP switches in combination. U.S. Pat. No. 6,507,158B1 discloses an enhanced protocol for enabling manual control of electronic ballast wherein the signaling is arranged such that certain signal lengths below a predetermined threshold are interpreted as DALI commands, and lengths above a threshold are interpreted as manual override.

SUMMARY OF THE INVENTION

US2015/0373796A1 discloses a multifunctional universal LED driver having switch block for analog LED current configuration on one hand, and having interface to receive a pulse-width modulation (PWM) signal for PWM LED current dimming on the other hand. A constraint in the prior art is that the PWM interface sets the LED current on top of the setting of the switch block. For example, the setting of the switch block sets a ceiling/maximum value of the LED current, and the PWM interface can only set to output how much percentage of the ceiling value. The applicant would like to mitigate this constraint.

US2021144818A1 discloses a light fixture, wherein an instruction received from an external device may override an instruction provided via manual control at switches.

A basic idea of the embodiments of the invention is that an electronic control signal interface can fully overrule the setting of the manual setting interface (such as (dip/jump) switches setting interface). This provides more headroom in the LED current setting for the electronic control signal, not limited by a maximum value that is set by the manual interface. For example, even if the manual interface sets the maximum LED current at half of the rated current, the electronic control signal can still set the maximum LED current in the full range up to the rated current, without limited at half of the rated current. Even more, the present application proposes to check the validity of the received electronic control signal and only a valid electronic control signal prioritizes over the setting of the manual setting interface while an invalid electronic control signal would not prioritize the setting of the manual setting interface. This provides a more robust control and prevent an invalid electronic control signal from making the driver enter an uncontrolled/unexpectable state.

The invention is defined by the claims.

According to examples in accordance with an aspect of the invention, there is provided a driver circuit configured to provide an output power for driving a lighting device, the driver circuit comprising:

a power control circuit having: a first interface configured to receive an electronic control signal; and a set of at least one manually-operable switch as a second interface configured to receive a manual control signal, wherein the power control circuit is configured to control the output power of the driver circuit according to the electronic control signal and the manual control signal; and a selection circuit configured to:

responsive to the electronic control signal meeting a certain requirement, control the power control circuit to disregard the manual control signal so as to control the output power of the driver circuit according to the electronic control signal without depending on state of the set of at least one manually-operable switch; and responsive to the electronic control signal not meeting the certain requirement, control the power control circuit to control the output power of the driver circuit according to the manual control signal, wherein the certain requirement comprises that the electronic control signal is valid.

Proposed concepts thus aim to provide schemes, solutions, concepts and designs pertaining to providing a driver circuit which caters for different control methods.

In particular, proposed embodiments provide a single driver circuit which caters for both a control method using wireless programming (e.g. NFC) and a control method using one or more DIP switches.

Specifically, embodiments of the invention propose a driver circuit for a lighting device having a power control circuit and a selection circuit, wherein the selection circuit is configured to control the power control circuit so that a manual control signal (provided from a set of at least one manually-operable switch) is either employed or disregarded. In this way, the power control circuit may be controlled to set the output power of the driver circuit according to either the manual control signal or an electronic control signal (e.g. provided via wireless programming, such as an NFC signal). Such selection of which control signal is employed may be made responsive to whether or not the electronic control signal meets a certain requirement. In this way, the maximum current setting by the electronic control signal is no longer limited at a maximum value set by the manual control signal, and have more freedom up to the rated current of the driver. To implement the detection, a simple detection circuit may be employed for determining whether or not the electronic control signal meets certain requirement, wherein the detection circuit provides a signal for controlling the selection circuit.

Purely by way of example, the certain requirement may require that the electronic control signal has a duty cycle, D, neither 100% nor floating, preferably in the range: 0<D<=95%, and more further preferably 20%~95%. A duty cycle in this range may mean employed to indicate that a valid electronic control signal is received. Otherwise, it is deemed that either the electronic control signal is not received or the received electronic control signal is not valid (for example it is considered the electronic control signal is an invalid stuck signal if the duty cycle is 100%). Thus, in some embodiments, the electronic control signal may comprise a Pulse-width modulation (PWM) signal. PWM control concepts may therefore be employed for switching between use of the electronic control signal or the manual control signal. Thus, a simple detection circuit may be incorporated into the driver circuit. Such a detection circuit mat be configured to alter its output signal (i.e. provide a detection signal) depending on whether or not the duty cycle D of the electronic control signal is within the range: 0<D<=95%. Other ranges may be employed, so as to cater for different PWM control methods of the electronic control signal. Further, other properties or characteristics of the electronic control signal ma by employed for controlling the selection circuit. For instance, it could be a digital coded signal like DALI protocol, wherein the absence of the signal on the DALI bus or unable to correctly decode a DALI signal means the driver should use the dip switch setting; if the DALI signal is correctly decoded, the driver should use the DALI signal's setting. It could also be a 1-10V electronic dimming interface, wherein if the signal is out of the range of 1-10V, the driver should use the dip switching setting; otherwise the driver should use the 1-10V signal to set the current. It could also be the Rset interface wherein an open or short circuit of the Rset makes the dip switch setting prevail; and an effective Rset overrule the dip switch setting.

In another aspect of the invention, a detailed circuit implementation is proposed. There is provided a driver circuit configured to provide an output power for driving a lighting device, the driver circuit comprising:
 a power control circuit having: a first interface configured to receive an electronic control signal; and a set of at least one manually-operable switch as a second interface configured to receive a manual control signal, wherein the power control circuit is configured to control the output power of the driver circuit according to the electronic control signal and the manual control signal; and
 a selection circuit configured to:
 responsive to the electronic control signal meeting a certain requirement, control the power control circuit to disregard the manual control signal so as to control the output power of the driver circuit according to the electronic control signal without depending on state of the set of at least one manually-operable switch; and
 responsive to the electronic control signal not meeting the certain requirement, control the power control circuit to control the output power of the driver circuit according to the manual control signal,
 the second interface may comprise:
 a resistor network coupled to the power control circuit; and
 a plurality of manually-operable switches whose states is determined by the manual control signal, connected to the resistor network and configured to adjust an effective resistance of the resistor network depending on the manual control signal, and
 the power control circuit may comprise:
 a voltage processing circuit configured to convert a voltage signal related to the output power into a processed voltage signal;
 a tuning circuit to tune the processed voltage signal according to an effective resistance of the resistor network; and
 a controller configured to control the output power according to the processed, optionally tuned, voltage signal.

In this way, a simple arrangement of resistors and DIP switches may therefore be employed for facilitating manual control of the output power of the driver circuit. And simple but accurate manual control of the output power may be facilitated.

By way of example, the selection circuit may comprise: a detection circuit configured to detect if the electronic control signal meets the certain requirement; and the selection circuit may be adapted to disable the tuning circuit thereby disabling the resistor network's influence on the processed voltage signal. In this example, the electronic control signal can disable the resistor network's influence on the power control circuit, thus overruling the manual control signal's setting.

In such an example, the voltage processing circuit may comprise a voltage divider, the second interface may be connected between a middle tap of the voltage divider and the controller, and wherein the selection circuit may comprise: a control switch configured, responsive to the detection circuit detecting that the electronic control signal meets the certain requirement, to disable the tuning circuit thereby disabling the resistor network's influence on the output of the voltage divider. Since the resistor network is connected to the middle tap of the voltage divider, the effective resistance of the resistor network sets the LED current by influences the voltage division ratio. To disable the resistor network's influence, the voltage division ratio can be kept thus the output of the voltage divider to the power control signal is no longer changeable by the resistor network.

Further, the control switch may be configured to short circuit an upper resistor in the voltage divider responsive to detection circuit detecting that the electronic control signal meets the certain requirement such that an output of the resistor network is the input to the voltage divider regardless of the effective resistance of the resistor network. A relatively simple arrangement of switches may therefore be employed by proposed embodiments. In this embodiment, the upper resistor is short circuited, thus the voltage corresponding to the output power is sensed by the power control circuit directly without being divided, mitigating any influence of the resistor network to the voltage division of the voltage divider.

In some embodiments, the processing circuit may comprises a voltage divider, the second interface may connected in series with the resistors in the voltage divider, the second interface comprising a resistor network and manual switches configured to adjust connections of the resistor network, and the selection circuit may comprise: a detection circuit configured to detect if the electronic control signal meets the certain requirement; and a control switch configured, responsive to the detection circuit detecting that the electronic control signal meets the certain requirement, to short circuit the resistor network. This provides an alternative way of the resistor network and enabling/disabling the resistor network.

In a further embodiment, it may further comprise a bias voltage applied to the resistor network thereby applying a bias component corresponding to an effective resistance of the resistor network to the output of the voltage divider, and the selection circuit may be configured to decouple the bias voltage from the resistor network responsive to the electronic control signal meeting the certain requirement thereby disabling the resistor network's influence on the output of the voltage divider. In this way, a simple coupling arrangement for coupling/decoupling the bias voltage implements enabling/disabling of the resistor network's influence on the voltage corresponding to the output power, thereby facilitating fast and accurate control of the driver circuit according to different control signals.

By way of example, the detection circuit may comprise a detection switch connected to the electronic control signal and control the bias voltage to charge an RC circuit depending on the electronic control signal, wherein the RC circuit is charged to a certain level capable of causing a bias switch to be open to decouple the bias voltage from the resistor network responsive to the electronic control signal meeting the certain requirement; otherwise not charged to the certain level and cause the bias switch to close to couple the bias voltage to the resistor network. More specifically, if the electronic control signal has an effective low value, meaning the electronic control signal is valid, the RC circuit can be charged to the certain level and its time constant is sufficient to keep the certain level for a time to implement the disabling thereby the electronic control signal prevailing; otherwise, the RC circuit will not be charged and the disabling will not be implemented, thereby causing the manual control signal to prevail.

Further, the RC circuit may be charged to the certain level capable of causing the control switch to be close to short circuit the upper resistor responsive to the electronic control signal meeting the certain requirement; otherwise not charged to the certain level and cause the control switch to be open. In this way, on top of decoupling/coupling the bias voltage, the upper resistor of the voltage divider is short circuited/not short circuited, enhancing the disabling/enabling of the resistor network's influence thereby enhancing the selection of a single one of the two control signal while overruling the other, and accurate control of the control switch may be facilitated through simple adaptation of the RC circuit.

Embodiments may therefore provide a selectable driver circuit that facilitates control via a single one of (i) wireless programming and (ii) a set of DIP switches. Such wireless programming and DIP switch control methods may function separately. In this way, the driver circuit's maximum current output according to the wireless programming method may be set independently of the maximum output current output according to the DIP switch control method. That is, the proposed driver circuit may facilitate independent control of its maximum output power using wireless programming (e.g. NFC) and a control method using one or more DIP switches. An improved driver circuit for driving a lighting device (such as an LED for example) may therefore be provided by the proposed concept(s).

According to other examples in accordance with an aspect of the invention, there is provided a lighting device comprising a driver circuit according to a proposed embodiment. In some examples, the lighting device may further comprise an LED configured to be driven with output power from driver circuit.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
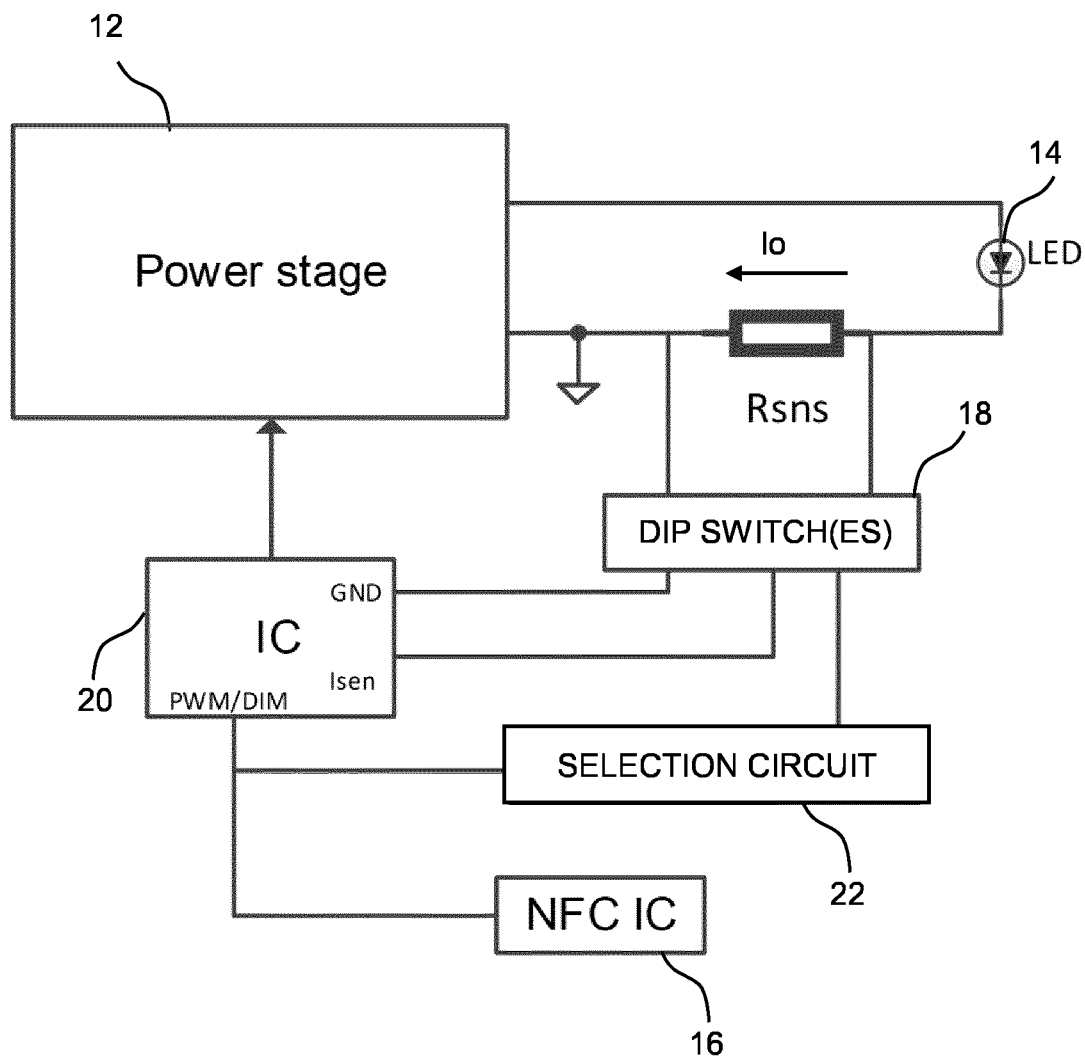
FIG. 1 shows a schematic block diagram of a LED driver circuit according to a proposed embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Implementations in accordance with the present disclosure relate to various techniques, methods, schemes and/or solutions pertaining to providing a driver circuit which caters for different control methods. In particular, one or more proposed concepts provide a single driver circuit which caters for both: a control method using wireless programming (e.g. NFC); and a control method using one or more DIP switches, and a setting by a single one independent of the setting by the other. According to proposed concepts, a number of possible solutions may be implemented separately or jointly. That is, although these possible solutions may be described below separately, two or more of these possible solutions may be implemented in one combination or another.

There is proposed a driver circuit that caters for two different control (e.g. dimming) protocols, such as an electronic control signal and a manual control signal. In particular, a driver circuit according to the proposed concept(s) has both wireless programming and DIP switch configurability. The proposed driver circuit may also be configured so that the two different control protocols are independent of other, such that an output current set by one of control protocols is independent from the an output current set by the other of the control protocols. For instance, an electronic control signal supplied via wireless programming may configure the maximum output power of the driver circuit to have first maximum output current, whereas a manual control signal from a set of at least one manually-operable switch may configure the maximum output power of the driver circuit to have second, different maximum output current. In this way, one state of the configuration of the driver circuit may be independent from another state of the configuration of the driver circuit. Note that wireless programming can be replaced by wired programming/configuring as long as it is an electronic control signal without being dependent on a manual switch. The electronic control signal may be for example a PWM signal, a DALI digital signal, a 1-10V analog dimming signal, a Rset/LEDset resistance signal, etc.

The driver circuit may also define a priority of an electronic control protocol and a manual control protocol. For instance, the electronic control protocol may be prioritized over the manual control protocol as long as the electronic control signal meets a certain requirement, such as being valid.

Such proposals may thus facilitate simple and accurate control of a driver circuit via two different control protocols. In particular, the driver circuit may cater for both wireless programming and DIP switch configurability.

Illustrative embodiments may therefore be utilized in many different types of lighting devices. Further, a driver circuit according to a proposed embodiment may incorporated with a lighting device.

However, it is envisaged that the driver circuit is of particular relevance to LEDs. Accordingly, embodiments may be used in relation to driving an LED. Thus, there may be provided an LED including a driver circuit according to a proposed embodiment.

FIG. 1 shows a schematic block diagram of a LED driver circuit according to a proposed embodiment. The driver circuit comprises a power stage 10 configured to an output current Io for driving a LED 14. The output current flows through a sensing resistor Rsns. The driver circuit also comprises a power control circuit having: a first interface 16 configured to receive an electronic control signal (from a NFC IC); and a second interface 18 configured to receive a manual control signal from a set of (i.e. one or more) DIP switches. In this example, the electronic control signal comprises a PWM signal. Alternatively, as mentioned above, the electronic control signal could be I2C digital signal, DALI digital signal, 1-10V analog dimming signal, Rset/LEDset resistance signal, etc.

Furthermore, the power control circuit also comprises an integrated controller IC 20 that is configured to control the power stage 12 (and thus the output power of the driver circuit) according to the electronic control signal and the manual control signal.

The driver circuit also comprises a selection circuit 22 that is configured to control the power control circuit to control the power stage according to one of either the manual control signal or the electronic control signal, while also mitigating the influence of a setting of the other control signal from limiting the range settable by the one selected control signal. More specifically, the selection circuit 22 is configured to determine if the electronic control signal meets a certain requirement, and then control the output power of the driver circuit, control the power stage 12 based on the result of the determination. In particular, responsive to the electronic control signal meeting the certain requirement, the IC 20 is adapted to disregard the manual control signal/setting thereof so as to control the power stage 12 according to the electronic control signal (without depending on state of the set of DIP switches). Conversely, responsive to the electronic control signal not meeting a certain requirement, the IC 20 is adapted to control the power stage 12 according to the manual control signal (i.e. depending on state of the set of DIP switches).

Purely by way of example, the certain requirement in this embodiment that the electronic control signal has a duty cycle, D, in the range: 0<D<=95%. Thus, if the electronic control signal has a duty cycle of 100% or is floating (i.e. no signal), the requirement is not met and the IC 20 controls the power stage 12 according to the manual control signal.

By way of further explanation of the above detailed example depicted in FIG. 1, an exemplary implementation may have a voltage input Vsns corresponding to the output current, a bias voltage vcc, and an adjustable impedance connected with the bias voltage and coupled to the voltage input, wherein the adjustable impedance corresponds to the state/configuration of the DIP switch(es) (i.e. manual control signal). A PWM input (i.e. electronic control signal) may be provided as a input via a wireless programming protocol.

A power controller may then be configured to receive the voltage input and the PWM input.

A selection circuit may then be provided which is configured to disable the connection between the bias voltage and the adjustable impedance when there is an effective PWM signal (i.e. when the PWM signal meets a PWM requirement, such as with an effective low value). As a result of there being no bias voltage, the adjustable impedance does not change the voltage signal and so the state/configuration of the DIP switch(es) has no effect.

Conversely, the selection circuit is configured to enable the connection between the bias voltage and the adjustable impedance when there is no effective PWM signal (i.e. when the PWM signal does not meets a PWM requirement). As a result, the bias voltage applies an adjustable bias to the voltage input depending on the state/configuration of the DIP switch(es), so the voltage input received by the power controller is dependent the state/configuration of the DIP switch(es) (i.e. manual control signal).

Figure 2:
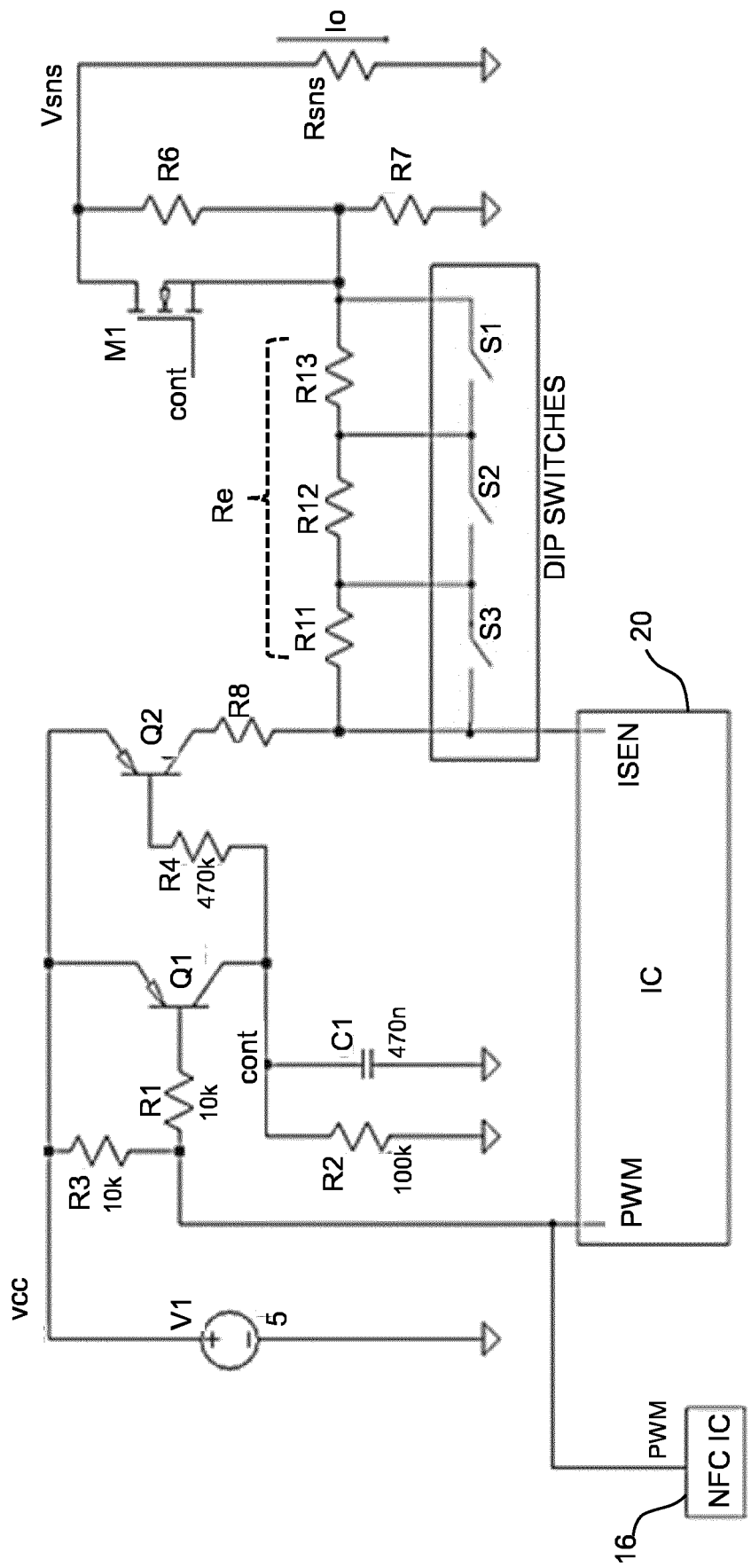
FIG. 2 shows a schematic circuit diagram of an exemplary embodiment.

FIG. 2 shows a schematic circuit diagram of an exemplary embodiment.

In the example of FIG. 2, the electronic control signal is a PWM signal provided from an NFC IC 16. The PWM signal (1 kHz) can be set to different duty cycles easily (e.g. via software).

The manual control signal is provided to the second interface via a set of first S1 to third S3 DIP switches.

The power control circuit comprises a voltage processing circuit R6, R7, that is configured to convert a voltage signal Vsns related to the output power into a processed voltage signal. Specifically, the voltage processing circuit comprises a voltage divider, wherein the second interface 18 is connected between a middle tap of the voltage divider and the integrated controller 20. Here, the second 18 interface comprises: a resistor network R11, R12, R13; and first S1 to third S3 manually-operable DIP switches whose states are determined by a manual control signal, such as a human's manipulation on the dip switch's on/off state. The first S1 to third S3 DIP switches are connected to the resistor network and configured to adjust an effective resistance of the resistor network depending on the manual control signal. Moreover, a bias voltage vcc may inject a current into the resistor network, form a bias voltage component corresponding to the effective resistance of the resistor network, and superimpose the bias voltage component with the output of the voltage divider to the power control circuit.

In this way, the power control circuit comprises a tuning circuit to tune the processed voltage signal according to an effective resistance Re of the resistor network R11, R12, R13. The integrated controller 20 is then configured to control the output power according to the processed and tuned voltage signal.

The selection circuit comprises a detection circuit that is configured to detect if the electronic control signal from the NFC IC 16 meets the certain requirement. The selection circuit is further adapted to disable the tuning circuit thereby disabling the resistor network's influence on the processed voltage signal.

In this example, the selection circuit comprises: a control switch M1 that is configured, responsive to the detection circuit detecting that the electronic control signal meets the certain requirement, to disable the tuning circuit, thereby disabling the resistor network's influence on the output of the voltage divider. Specifically, the control switch M1 is configured to short circuit an upper resistor R6 in the voltage divider, responsive to detection circuit detecting that the electronic control signal meets the certain requirement (such that an output of the resistor network is the input to the voltage divider regardless of the effective resistance Re of the resistor network).

A bias voltage (vcc) is applied to the resistor network, thereby applying a bias voltage component corresponding to an effective resistance Re of the resistor network to the output of the voltage divider. The selection circuit is also configured to decouple the bias voltage from the resistor network, responsive to the electronic control signal meeting the certain requirement, thereby disabling the resistor network's influence on the output of the voltage divider.

For this purpose, the detection circuit comprises a detection switch Q1 connected to the electronic control signal. The detection switch Q1 controls the bias voltage to charge an RC circuit depending on the electronic control signal. If the electronic control signal has a low value (e.g. its duty cycle is not 100%), it is considered to be valid. In the moment the electronic control signal is low value, the transistor Q1 becomes conductive and the RC circuit is charged to a certain level capable of causing a second (bias) switch Q2 to be open and thus decouple the bias voltage from the resistor network responsive to the electronic control signal meeting the certain requirement. The time constant of the RC circuit is large such that the voltage on the capacitor C1 can keep high until the next time the transistor Q1 becomes conductive. Otherwise, if the electronic control signal is high value constantly, it is considered to be invalid, the transistor Q1 would not become conductive and the RC circuit is not charged to the certain level causes the second (bias) switch Q2 to close and thus couple the bias voltage to the resistor network.

That is, the RC circuit of the detection circuit is configured such that, where the duty cycle of the PWM electronic control signal meets the certain requirement (e.g. in the range of 20%~95%), the RC circuit is configured to cause the control switch M1 to close and thus short circuit the upper resistor of the voltage divider. Otherwise, when the RC circuit is not charged to the certain level (i.e. when the duty cycle of the PWM electronic control signal does not meet the certain requirement, e.g. is approximately 100% or floating), the RC circuit is configured to cause the control switch M1 to be open.

Accordingly, the circuit arrangement of FIG. 2 is configured to operate in two modes, wireless programming mode and manual control mode. Switching between the two modes is controlled according to the duty cycle of the PWM electronic control signal from the NFC IC 16. A summary of the two modes is provided as follows:

In Wireless programming mode—when the duty cycle of the PWM electronic control signal is in the range of 20%~95%: The detection switch Q1 conducts at interval time when the PWM electronic control signal is in low value (assuming the values of R2 and C1 are chosen so that the time constant is large enough), thus resulting in the control voltage cont being very close to Vcc (e.g. 5V). As a result, second (bias) switch Q2 remains off. At the same time, the control switch M1 conducts/closes and R6 is therefore shorted. Since Io*Rsns is always equal to IC Isen voltage, the Io maximum current is independent from the state/configuration of the DIP switch(es) S1, S2 and S3. The real value of the current is set by the duty cycle of the PWM electronic control signal.

In manual control mode—when the duty cycle of the PWM electronic control signal is 100% or floating: The detection switch Q1 does not conducted, thus resulting in the second (bias) switch Q2 conducting (i.e. being on). The control voltage is divided by R4 and R2, which is lower than 0.9V, thus causing the control switch M1 to be off. With the control switch M1 off (i.e. open), R6 is introduced to control circuit, and the bias voltage component on the resistor network is superimposed with the output of the voltage divider, that so Io maximum current is determined by the state/configuration of the DIP switch(es) S1, S2 and S3, and Io maximum current is independent of the wireless programming which does not have an valid electronic control signal at all.

Figure 3:
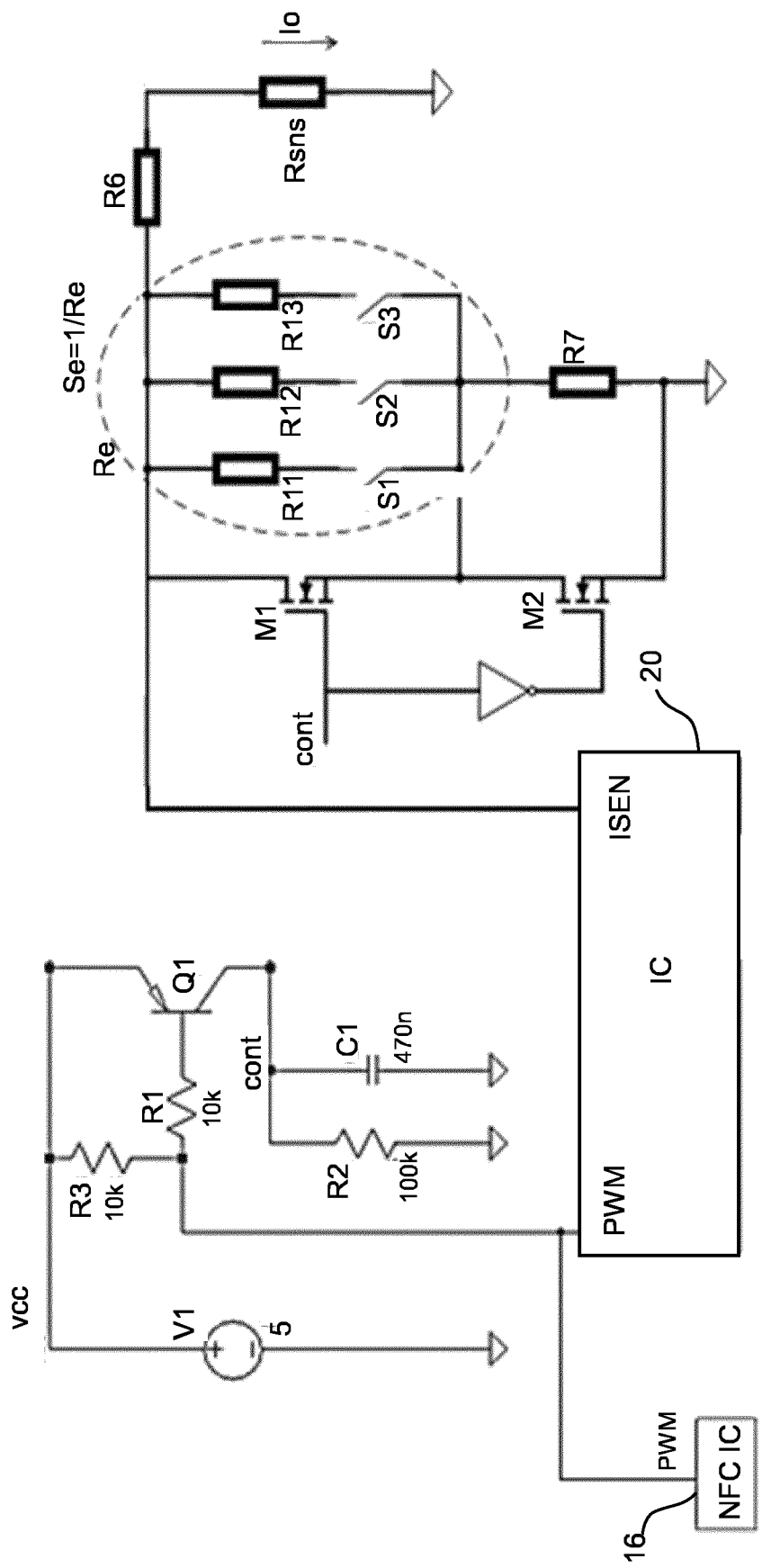
FIG. 3 shows a schematic circuit diagram of a LED driver circuit according to another proposed embodiment.

FIG. 3 shows a schematic circuit diagram of a LED driver circuit according to another proposed embodiment. Here, the embodiment of FIG. 3 is a modified version of embodiment of FIG. 2. In summary, the embodiment of FIG. 3 differs from that of FIG. 2 in the arrangement of the processing circuit and the omission of the second bias) switch Q2.

In the embodiment of FIG. 2, the second interface is connected in series with the resistors R11, R12, R13 in the voltage divider, The detection circuit is configured to detect if the electronic control signal meets the certain requirement. Responsive to the detection circuit detecting that the electronic control signal meets the certain requirement, the control switch M1 is configured, to short circuit the resistor network.

Thus, switching between the two modes is controlled according to the duty cycle of the PWM electronic control signal from the NFC IC 16. A summary of the two modes for the embodiment of FIG. 3 is provided as follows:

In Wireless programming mode—when the duty cycle of the PWM electronic control signal is in the range of 20%~95%: The detection switch Q1 conducts at interval time (assuming the values of R2 and C1 are chosen so that the time constant is large enough), thus resulting in the control voltage cont being very close to Vcc (e.g. 5V). As a result, the control switch M1 conducts/closes and the second control switch M2 is off/open. The effective resistance Re of the resistor network is therefore shorted. Since Io*Rsns is divided by R6 and R7 then equal to IC 20 Isen voltage, the Io maximum current is fixed, which is independent from the state/configuration of the DIP switch(es) S1, S2 and S3.

In manual control mode—when the duty cycle of the PWM electronic control signal is 100% or floating: The detection switch Q1 does not conducted. This results in the control voltage being zero, which is lower than 0.9V, thus causing the control switch M1 to be off/open and the second control switch M2 being on/closed. With the control switch M1 off (i.e. open), R7 is shorted and the equivalent resistor Re of the resistor network is therefore shorted is introduced to the circuit, that so Io maximum current is independent of maximum current set in the wireless programming mode.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A driver circuit configured to provide an output power for driving a lighting device, the driver circuit comprising:
   a power control circuit having: a first interface configured to receive an electronic control signal (PWM/NFC); and a set of at least one manually-operable switch as a second interface configured to receive a manual control signal (MCS), wherein the power control circuit is configured to control the output power of the driver circuit according to the electronic control signal and the manual control signal; and
   a selection circuit configured to:
   responsive to the electronic control signal meeting a certain requirement, control the power control circuit to disregard the manual control signal so as to control the output power of the driver circuit according to the electronic control signal without depending on state of the set of at least one manually-operable switch; and
   responsive to the electronic control signal not meeting a certain requirement, control the power control circuit to control the output power of the driver circuit according to the manual control signal,
   wherein the electronic control signal comprises a PWM signal, and the certain requirement comprises that the PWM signal is valid and has a duty cycle, D.

2. The driver circuit of claim 1, wherein the certain requirement requires that the PWM signal has the duty cycle, D,
   in the range: 0<D<=95%.

3. The driver circuit according to claim 1 wherein the second interface comprises:
   a resistor network; and
   a plurality of manually-operable switches whose states is determined by the manual control signal, connected to the resistor network and configured to adjust an effective resistance of the resistor network depending on the manual control signal;
   and wherein the power control circuit comprises:
   a voltage processing circuit configured to convert a voltage signal related to the output power into a processed voltage signal;
   a tuning circuit to tune the processed voltage signal according to an effective resistance of the resistor network; and
   a controller configured to control the output power according to the processed, voltage signal.

4. The driver circuit according to claim 3, wherein the selection circuit comprises:
   a detection circuit configured to detect if the electronic control signal meets the certain requirement;
   and the selection circuit is adapted to disable the tuning circuit thereby disabling the resistor network's influence on the processed voltage signal responsive to the electronic control signal meeting the certain requirement.

5. The driver circuit according to claim 4, wherein the voltage processing circuit comprises a voltage divider,
   wherein the second interface is connected between a middle tap of the voltage divider and the controller,
   and wherein the selection circuit comprises: a control switch configured, responsive to the detection circuit detecting that the PWM signal meets the certain requirement, to disable the tuning circuit thereby disabling the resistor network's influence on the output of the voltage divider.

6. The driver circuit according to claim 5, wherein the control switch is configured to short circuit an upper resistor in the voltage divider responsive to detection circuit detecting that the PWM signal meets the certain requirement such that an output of the resistor network is the input to the voltage divider regardless of the effective resistance of the resistor network.

7. The driver circuit according to claim 3, wherein the processing circuit comprises a voltage divider,
   wherein the second interface is connected in series with the resistors in the voltage divider, the second interface comprising a resistor network and manual switches configured to adjust connections of the resistor network,
   and wherein the selection circuit comprises: a detection circuit configured to detect if the PWM signal meets the certain requirement; and a control switch configured, responsive to the detection circuit detecting that the PWM signal meets the certain requirement, to short circuit the resistor network.

8. The driver circuit according to claim 5, further comprising a bias voltage applied to the resistor network thereby applying a bias component corresponding to an effective resistance of the resistor network to the output of the voltage divider, and
   wherein the selection circuit is configured to decouple the bias voltage from the resistor network responsive to the PWM signal meeting the certain requirement thereby disabling the resistor network's influence on the output of the voltage divider.

9. The driver circuit according to claim 8, wherein the detection circuit comprises a detection switch connected to the PWM signal and controls the bias voltage to charge an RC circuit depending on the PWM signal, wherein the RC circuit is charged to a certain level capable of causing a bias switch to be open to decouple the bias voltage from the resistor network responsive to the PWM signal meeting the certain requirement; otherwise not charged to the certain level and cause the bias switch to close to couple the bias voltage to the resistor network.

10. The driver circuit according to claim 9, wherein the RC circuit is charged to the certain level capable of causing the control switch to be close to short circuit the upper resistor responsive to the PWM signal meeting the certain requirement; otherwise not charged to the certain level and cause the control switch to be open.

11. A lighting device comprising a driver circuit according to claim 1 and the set of at least one manually-operable switch.

12. The lighting device of claim 11 further comprising an LED configured to be driven with output power from driver circuit.

13. The driver circuit of claim 1, wherein the certain requirement requires that the PWM signal has the duty cycle, D, in the range: 20%~95%.

* * * * *